(12) United States Patent
Schifrin et al.

(10) Patent No.: US 11,946,566 B2
(45) Date of Patent: Apr. 2, 2024

(54) VALVE ACTUATOR DEVICE FOR FLUID FLOW CONTROL

(71) Applicant: Motomecanica Argentina S.A., Buenos Aires (AR)

(72) Inventors: Emiliano Schifrin, Buenos Aires (AR); Adrian Oscar Bucciarelli, Buenos Aires (AR)

(73) Assignee: Batfer Investment, S.A., Montevideo (UY)

( * ) Notice: Subject to any disclaimer, the term of this patent is extended or adjusted under 35 U.S.C. 154(b) by 0 days.

(21) Appl. No.: 18/149,297

(22) Filed: Jan. 3, 2023

(65) Prior Publication Data
US 2023/0213116 A1 Jul. 6, 2023

(51) Int. Cl.
*F16K 31/528* (2006.01)
*F16K 31/524* (2006.01)
*F16K 37/00* (2006.01)

(52) U.S. Cl.
CPC .... *F16K 37/0083* (2013.01); *F16K 31/52441* (2013.01); *F16K 31/52458* (2013.01); *F16K 31/5282* (2013.01); *F16K 31/5284* (2013.01)

(58) Field of Classification Search
CPC .. F16K 31/521; F16K 31/522; F16K 31/5282; F16K 31/5284; F16K 31/52458; F16K 31/52441; F16K 37/0083; F16K 31/502; Y10T 74/20504; Y10T 74/18752; Y10T 74/19767; Y10T 74/18984; Y10T 74/18888; Y10T 74/1896; Y10T 74/18936; Y10T 74/18928; Y10T 74/18968; Y10T 74/18944

USPC .......... 251/228, 279, 298–317.1, 58; 74/107
See application file for complete search history.

(56) References Cited

U.S. PATENT DOCUMENTS

| | | | | | |
|---|---|---|---|---|---|
| 988,864 | A | * | 4/1911 | Cravens | B60T 17/043 251/14 |
| 1,156,392 | A | * | 10/1915 | Conrader | F16K 31/1635 251/233 |
| 2,833,511 | A | * | 5/1958 | Fletcher | F16K 1/24 251/298 |

(Continued)

FOREIGN PATENT DOCUMENTS

| | | |
|---|---|---|
| WO | 2006070714 | 7/2006 |
| WO | 2020118253 | 11/2020 |

OTHER PUBLICATIONS

"Monitoring of Quarter Turn Actuators," www.turck.de/en/monitoring-of-quarter-turn-actuators-5245.php, accessed Dec. 20, 2021.

*Primary Examiner* — Craig J Price
(74) *Attorney, Agent, or Firm* — Werner IP Law, P.C.

(57) ABSTRACT

The present invention refers to a valve actuator device comprising an upper plate and a lower plate facing each other, defining a housing inside which a cylinder with a stem is housed. The stem is connected to a rotor arm by a guiding element inserted and slidably in line between a lower position and an upper position within guiding grooves arranged in the respective upper plate and lower plate. The rotor arm is configured to rotate about a rotation axle arranged in a rotating element formed by two portions: an adapter portion for the connection thereof with the valve stem, and a display portion comprising a visual indicator. The valve actuator device includes a position sensor system for detecting an open position and a closed position.

16 Claims, 4 Drawing Sheets

(56) References Cited

U.S. PATENT DOCUMENTS

| | | | | |
|---|---|---|---|---|
| 2,908,182 | A * | 10/1959 | Bacchi | F16K 31/502 74/89.45 |
| 2,954,754 | A * | 10/1960 | Flick | F16K 31/1635 251/63 |
| 3,043,160 | A * | 7/1962 | Killian | F16K 31/502 74/89.45 |
| 3,147,766 | A * | 9/1964 | Herring | F16K 31/535 74/509 |
| 3,261,266 | A * | 7/1966 | Ledeen | F15B 15/066 92/138 |
| 3,650,506 | A * | 3/1972 | Bruton | F16K 17/32 251/63.4 |
| 3,672,262 | A * | 6/1972 | Karr | F15B 15/066 92/140 |
| 3,737,142 | A * | 6/1973 | Boswell | F16K 31/5282 74/107 |
| 3,797,324 | A * | 3/1974 | Sheesley | F15B 15/066 92/138 |
| 3,892,381 | A * | 7/1975 | Prescott | F16K 5/0647 251/47 |
| 3,927,573 | A | 12/1975 | Sheesley et al. | |
| 4,170,169 | A * | 10/1979 | Shafer | F16K 31/1635 92/138 |
| 4,265,132 | A * | 5/1981 | Robertson | F16H 21/44 74/526 |
| 4,533,113 | A * | 8/1985 | Francart, Jr. | F16K 5/0242 74/105 |
| 4,537,085 | A * | 8/1985 | Valentine | B25J 17/0241 74/99 R |
| 4,635,901 | A | 1/1987 | Pond | |
| 4,697,468 | A * | 10/1987 | Bergstrand | F16H 21/44 74/108 |
| 4,882,977 | A * | 11/1989 | Himeno | F01B 31/12 92/138 |
| 4,945,949 | A * | 8/1990 | Carpentier | B65D 90/66 137/613 |
| 6,135,147 | A | 10/2000 | Peters et al. | |
| 6,250,326 | B1 * | 6/2001 | Kimball | F16K 17/386 137/75 |
| 7,739,978 | B2 | 6/2010 | Beckman et al. | |
| 8,863,596 | B2 * | 10/2014 | Holtgraver | F16K 31/1635 74/49 |
| 9,534,700 | B2 | 1/2017 | Denat et al. | |
| 9,618,136 | B2 | 4/2017 | Bell | |
| 9,927,259 | B2 | 3/2018 | Dequarti | |
| 10,094,299 | B2 * | 10/2018 | Raimbault | F02D 9/1005 |
| 2017/0292628 | A1 | 10/2017 | Dolenti | |
| 2018/0172032 | A1 | 6/2018 | Modinger et al. | |
| 2021/0123543 | A1 | 4/2021 | Inoue et al. | |

* cited by examiner

VALVE ACTUATOR DEVICE FOR FLUID FLOW CONTROL

CROSS-REFERENCE TO RELATED APPLICATION

This application claims priority to Argentine Application No. 20220100010 filed on Jan. 4, 2022, the disclosure of which is incorporated herein by reference for all purposes.

TECHNICAL FIELD OF THE PRESENT INVENTION

The present invention refers to the technical field of valves for fluid flow control, more particularly to valve actuators for fluid flow control in industrial installations or oil or water extraction facilities.

BACKGROUND OF THE INVENTION

The valve actuator device for fluid flow control of the present invention has been designed to achieve a valve actuation for fluid flow control in an easy and safe way; a simple and robust design makes it possible to supply the device components through machining centers without the need for complex machinery, which allows the provision of actuator device components from anywhere in the world.

Due to the simplicity of its design, the maintenance thereof is quick and safe, which can be carried out either in the field or on location without the need to take the equipment to a maintenance center, involving a significant reduction in time and costs related to logistics and qualified staff.

Additionally, special tools or complex machines are not necessary for the maintenance thereof and it allows full disassembly of all its components for repair, calibration or change of any of its components.

One of the main advantages of this actuator is its weight. This allows the manipulation thereof without the need for extra machinery, which allows it to exert an output torque of around 2000 Nm, with an operating pressure of 2500 psi. This guarantees the operators' safety and well-being.

Therefore, the present valve actuator device for fluid flow control presents numerous advantages for the function for which it is intended compared to existing actuators due to the novel design thereof that provides safety, robustness, ease of operation and low-cost maintenance.

SUMMARY OF THE INVENTION

The present invention refers to a ¼-turn actuator, especially configured to be used in plug valves, or rotary valves, such as ball or butterfly valves.

The valve actuator device of the present invention comprises:

an upper plate and a lower plate facing each other defining a housing inside which a cylinder with a stem is housed, said stem being connected to a rotor arm by means of a guiding element inserted and slidably in line between a lower position and an upper position within guiding grooves arranged in the respective upper and lower plates, wherein said rotor arm is configured to rotate about a rotation axle arranged in a rotating element, said rotating element being formed by two portions: an adapter portion for the connection thereof with the valve stem comprising the rotation axle in which the rotor arm is inserted, and a display portion comprising a visual indicator, and a position sensor system for detecting an open position and a closed position.

The actuator device of the present invention has a simple and robust design and is easy to manufacture and maintain, which allows valves to be operated in any industrial or oil or water extraction facility, with a differential pressure of up to 15,000 psi, generating a maximum torque of 2000 NM with an operating pressure of 2500 psi.

DETAILED DESCRIPTION OF THE INVENTION

Figure 1:
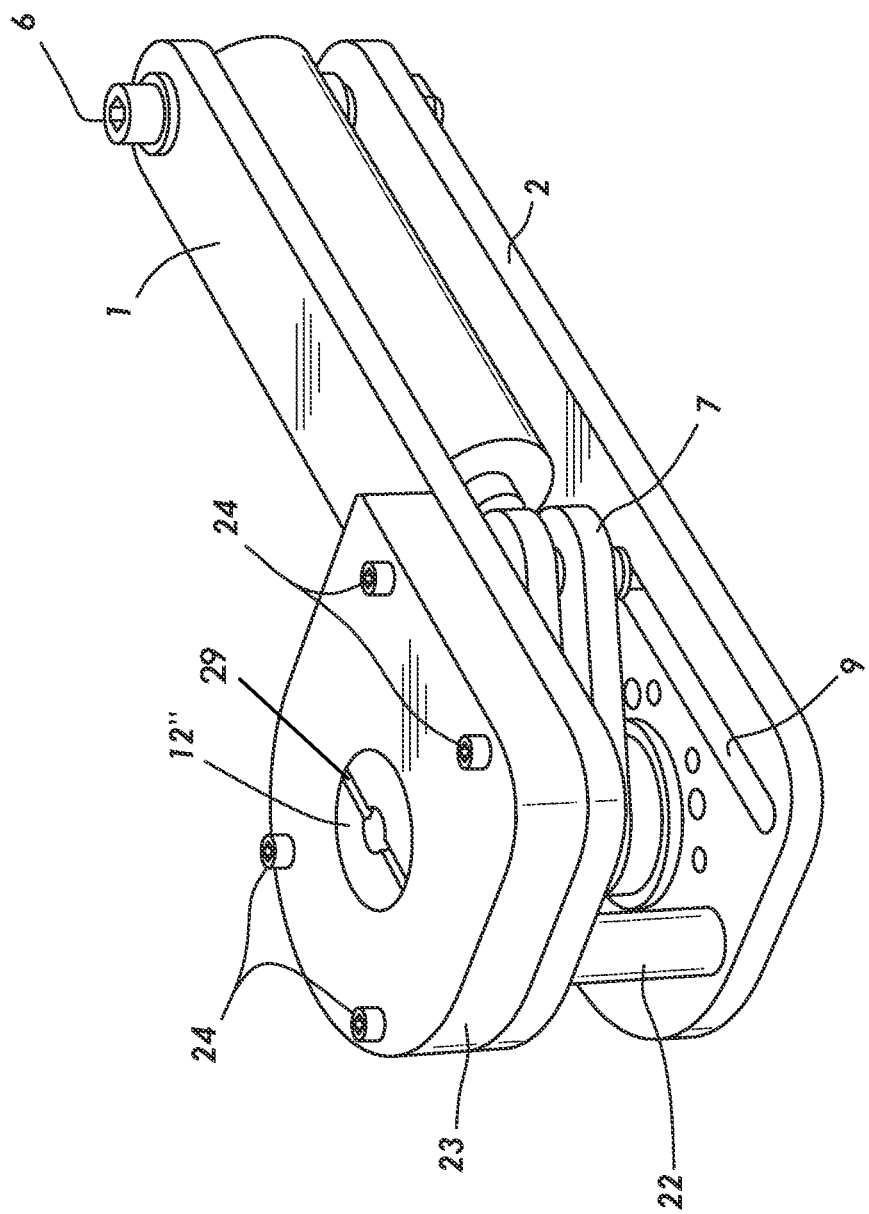
FIG. 1 shows a perspective view of the quarter-turn actuator of the present invention.
Figure 2:
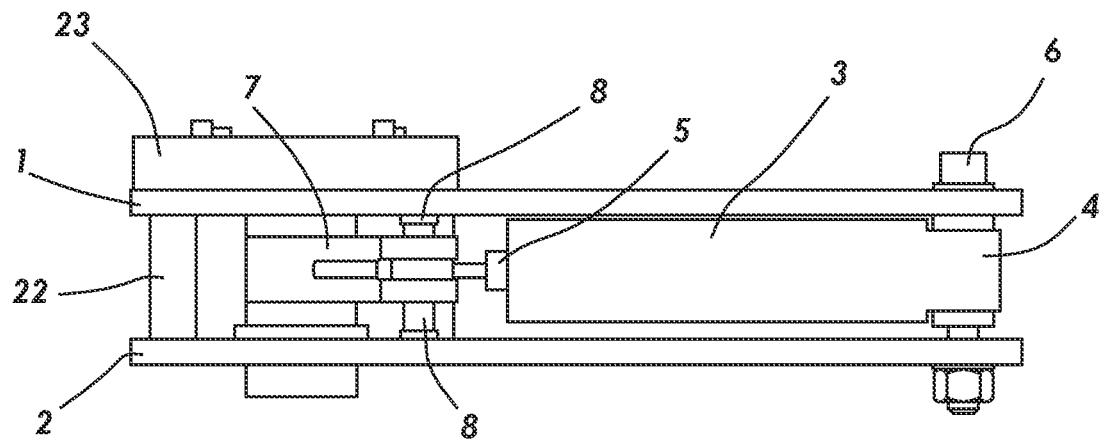
FIG. 2 shows a front elevational view of the quarter-turn actuator of the present invention.

The invention will now be described with reference to FIGS. 1 to 5 where a preferred example of the invention is shown. However, the invention is not limited to said example as it includes modifications obvious to any person with ordinary skills in the arts.

The valve actuator device of the present invention comprises an upper plate 1 and a lower plate 2 facing each other that define a support structure within which a hydraulic or pneumatic cylinder 3 with two ends, a fixed end 4 and a mobile end 4' of a stem 5, is housed. The fixed end 4 is attached to the respective upper plate 1 and lower plate 2 by fixing means 6, such as a through bolt.

Figure 3:
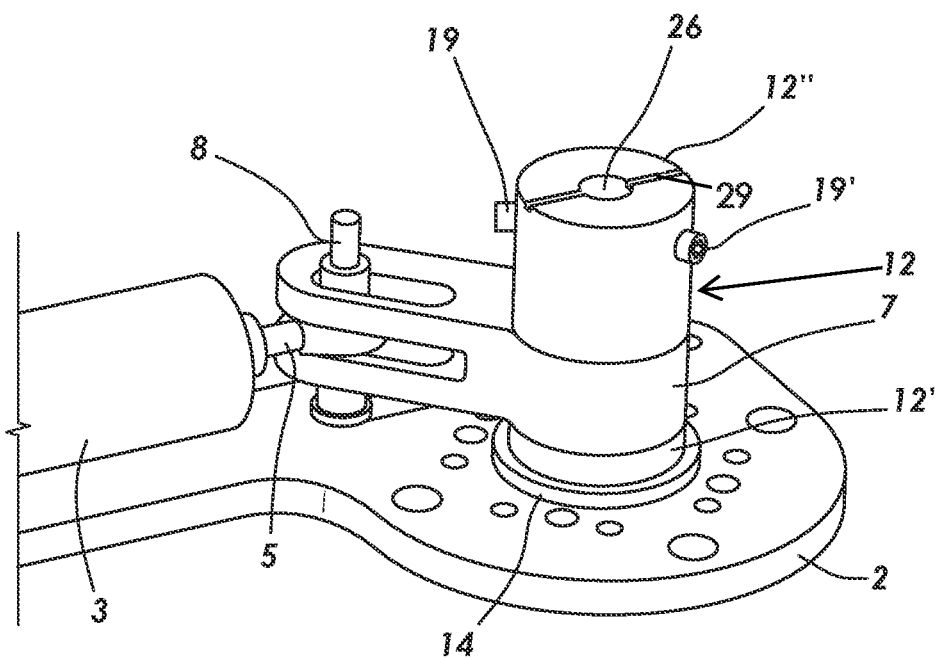
FIG. 3 shows a detailed view of the cylinder, guiding element, rotor arm and rotating element arrangement.
Figure 4:
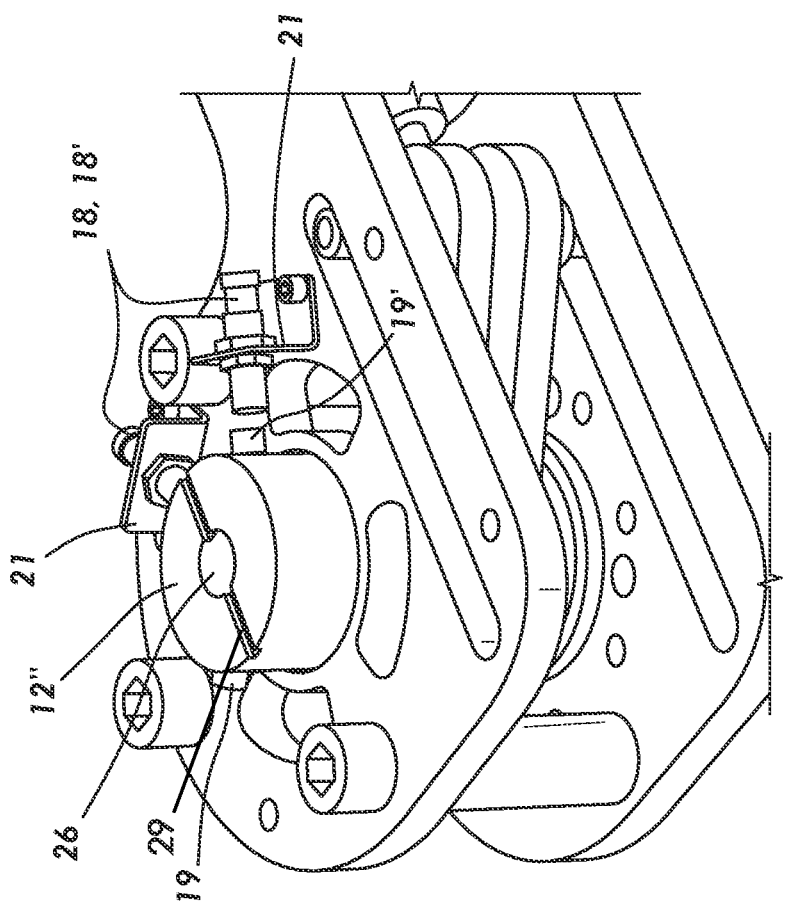
FIG. 4 shows a detailed view of the position sensor system.

The stem 5 of said cylinder 3 is connected to a rotor arm 7 by means of a guiding element 8. Said guiding element 8 has two opposite ends inserted into respective guiding grooves 9, 9' arranged on the respective upper plate 1 and lower plate 2 aligned with the axial axis of the stem 5, Said opposite ends of said guiding element S preferably include guiding bushings 17 to facilitate the sliding thereof within the guiding grooves 9, 9', The guiding grooves 9, 9', together with the guiding bushings 17, support the axial loads that occur when cylinder 3 actuates. (FIG. 3)

The guiding element 8 can move within said grooves 9, 9', between an upper position and a lower position co-linearly with the movement direction of stem 5 when it receives the load from cylinder 3 when it is actuated.

As above mentioned, stem 5 is connected to the rotor arm 7 by means of a guiding element 8 whose respective ends are inserted and displaced within the respective guiding grooves 9, 9' located on opposing upper plate 1 and lower plate 2. This linear movement is translated into a rotational movement of the rotor arm 7 due to the fact that the guiding element 8 is slidably inserted into groove 10 of the rotor arm 7, Thus, when actuating the cylinder 3, the stem 5 moves said guiding element 8 between an upper position and a lower position guided by the respective guiding grooves 9, 9', this linear displacement generating a rotation strength on the rotor arm 7 that rotates about its rotation axle 11 which is part of a rotating element 12 (see FIG. 3).

Figure 5:
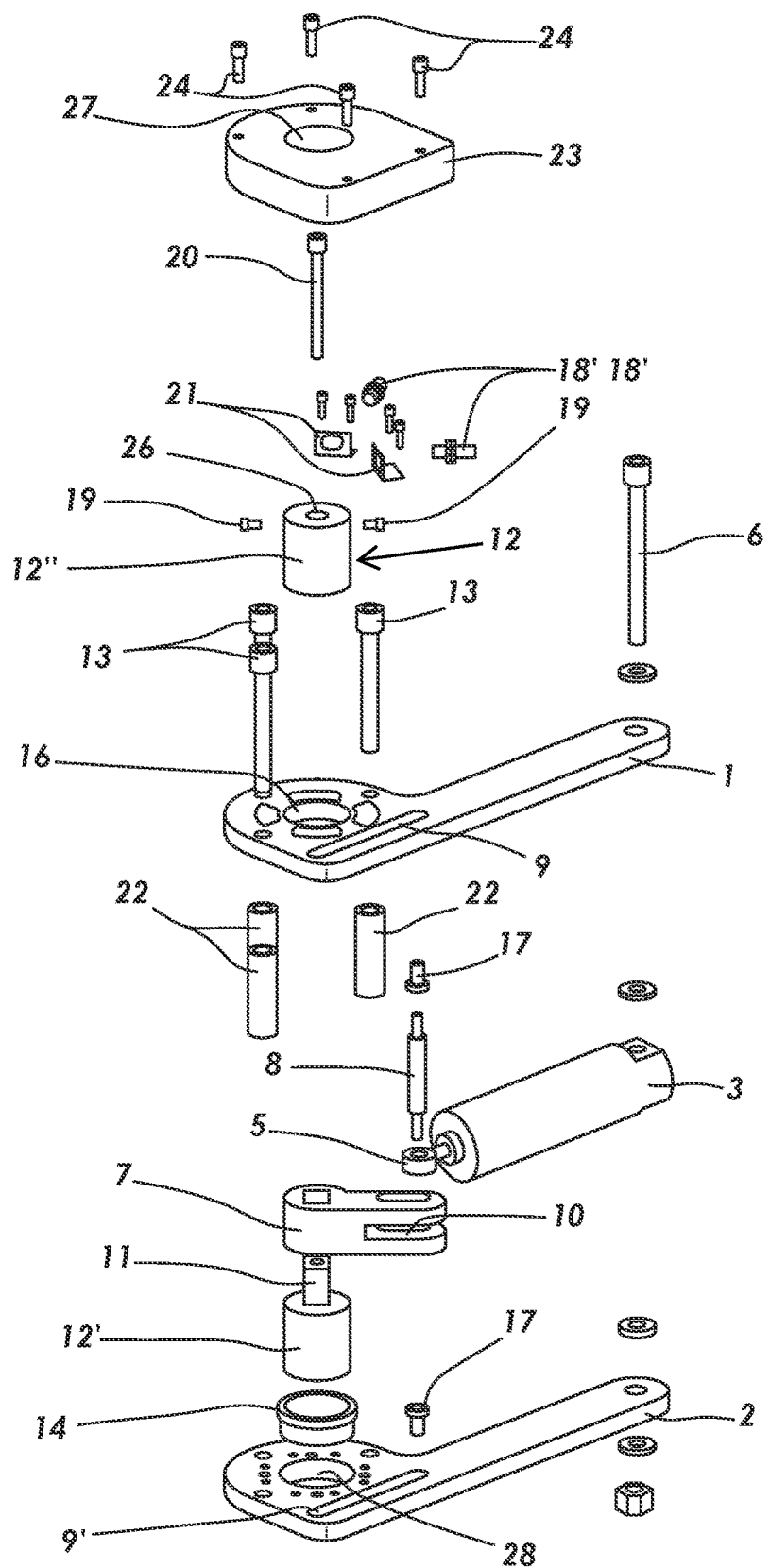
FIG. 5 shows an exploded view of the actuator of the present invention.

In this way, cylinder 3, guiding element 7, rotor arm 7, and part of the rotating element 12 remain enclosed in the housing defined between the upper plate 1 and lower plate 2 as shown in FIG. 1, and they are assembled by means of a plurality of through holes located in the upper plate 1 and lower plate 2 and the respective anchor bolts 13 and spacer elements 22, which provides the assembly structural resistance and robustness (see FIG. 5).

The rotating element 12 is made up of two portions: a first portion or adapter portion 12' for the connection thereof with the stem of valve A that has an end with an opening configured to receive an interchangeable adapter for each type of valve A, and an opposite end where a rotation axle 11 is projected for the insertion of rotor arm 7, The first portion or adapter portion 12' is inserted into a through hole 28 of the lower plate 2 by means of a bushing 14, preferably made of bronze, and projects out of the plane of lower plate 2 (FIG. 5).

The second portion or display portion 12" of the rotating element 12 has a main body with a through hole 26, a bearing end, and a slotted end that operates as a visual indicator 29 for the operator to check a first open position and a second closed position of valve A.

Said second portion or display portion 12" is coaxially arranged with the first portion or adapter portion 12' on the bearing end thereof after the rotor arm 7 is inserted into the rotation axle 11 through a through hole in the rotor arm 15. The assembly formed by the first portion or adapter portion 12', the broken arm 7 and the second display portion 12" is put together by means of a fixing means 20 that is inserted into a thread arranged on the rotation axle 11 for this purpose.

The main body of the second display portion 12" is inserted into a through hole of the upper plate 16, and part thereof projects out of the plane of the upper plate 1 defining a volume of the main body of the display portion 12". Interdependent to said volume of the main body of the display portion 12", there is a position sensor system made up of a set of metallic reference elements 19, 19' and respective sensors 18, 18'. The metallic reference elements 19, 19' are arranged on the surface of said volume of the main body of the display portion 12', preferably threaded, and operatively cooperating with respective position sensors 18, 18' arranged on the upper plate 1 for the detection of an open position and a closed position of valve A.

Said position sensors 18, 18' are fixed to the upper plate 1 by support means 21, preferably bracket type, and arranged on a 90° imaginary circumference arc (quarter turn). In this way, each time the actuator reaches a final position, either open or closed, the sensors 18, 18' will detect said positions by means of the metallic position reference elements 19, 19' arranged on the surface of the display portion 12" of the rotating element 12 (see FIG. 4).

The position sensors 18, 18' can be conventional inductive-type position sensors.

The sensor system as well as the body of the display portion 12" of the rotating element 12, are enclosed in a housing defined by a main cover cap 23. The cover cap 23 is fixed to the upper plate 1 by fixing means 24 inserted into respective holes 25 present in the upper plate 1 (see FIG. 1).

Said main cover cap 23 has a through hole 27 that receives the display portion 12" of the rotating element 12 so that both components, the main cover cap 23 and the display portion 12", form a visual indication system for the operator to see an open position or a closed position and even intermediate positions.

As already mentioned, when the rotor arm 7 receives the load from the cylinder 3 through the guiding element 8, it turns the linear movement of said guiding element 8 into a rotational movement of the rotor arm 7 about the rotation axle 11 thereof causing the rotation of the rotating element 12 which describes a 90° movement between an open position and a closed position.

The actuator device of the present invention is designed to be operated with an output torque of 2000 Nm, an operating pressure of 2500 psi in an operating temperature range from −20° C. (−4° F.) to +80° C. (176° F.), and a rotation capacity of 90°±1°.

REFERENCE NUMBERS

Upper plate 1
Lower plate 2
Cylinder 3
Cylinder fixed end 4
Cylinder free end 4'
Cylinder stem 5
Cylinder fixing means 6
Rotor arm 7
Guiding element
Guiding grooves 9, 9'
Rotor groove 10
Rotation axle 11
Rotating element 12
Anchor bolts 13
Lower plate bushing 14
Rotor arm through hole 15
Upper plate through hole 16
Guiding bushings 17
Position sensors 18, 18'
Position reference elements 19, 19'
Bolt 20
Sensor support means 21
Spacer elements 22
Main cover cap 23
Cover plate fixing elements 24
Upper plate holes 25
Display portion through hole 26
Cover cap through hole 27
Lower plate through hole 28

The invention claimed is:

1. A valve actuator device, characterized in that it comprises an upper plate (1) and a lower plate (2) facing each other, defining a housing inside which a cylinder (3) with a stem is housed, said stem (5) being connected to a rotor arm (7) by means of a guiding element (8) inserted and slidably in line between a lower position and an upper position within guiding grooves (9, 9') arranged in the respective upper plate (1) and lower plate (2), wherein said rotor arm (7) is configured to rotate about a rotation axle (11) arranged in a rotating element (12), said rotating element (12) being formed by two portions: an adapter portion (12'), adapted to be connectable to a valve stem, comprising the rotation axle (11) in which the rotor arm (7) is inserted, and a display portion (12") comprising a visual indicator (29), and a position sensor system (18, 18') for detecting an open position and a closed position.

2. The valve actuator device according to claim 1, characterized in that said cylinder (3) has a fixing end (4) attached to the respective upper plate (1) and lower plate (2) by fixing means (6).

3. The valve actuator device according to claim 1, characterized in that said guiding element (8) includes guiding bushings (17).

4. The valve actuator device according to claim 1, characterized in that said guiding grooves (9, 9') are aligned with the axial axis of the stem (5).

5. The valve actuator device according to claim 1, characterized in that the housing defined between the upper plate (1) and lower plate (2) is assembled by means of a plurality of through holes in the upper plate (1) and lower plate (2) and respective anchor bolts (13) and spacer elements (22).

6. The valve actuator device according to claim 1, characterized in that the rotor arm (7) is inserted onto the rotation axle (11) through a through hole of the rotor arm (15), between said display portion (12") and said adapter portion (12').

7. The valve actuator device according to claim 1, characterized in that said display portion (12") and said adapter portion (12') are coaxially arranged with each other.

8. The valve actuator device according to claim 1, characterized in that the assembly formed by the adapter portion (12'), the rotor arm (7) and the display portion (12") is put together by means of a fixing means (20) inserted through a through hole of the display portion (12") in a thread on the rotation axle (11).

9. The valve actuator device according to claim 1, characterized in that a main body of the second display portion (12") is inserted into a through hole of the upper plate (16), and part thereof projects out of the plane of the upper plate (1) defining a volume of the main body of the display portion (12").

10. The valve actuator device according to claim 9, characterized in that on a surface of said volume of the main body of the display portion (12"), a pair of metallic position reference elements (19, 19') is arranged, which operatively cooperate with respective position sensors (18, 18') arranged on the upper plate (1).

11. The valve actuator device according to claim 10, characterized in that said position sensors (18, 18') are fixed to the upper plate (1) by support means (21).

12. The valve actuator device according to claim 11, characterized in that said position sensors (18, 18') are arranged on a 90° imaginary circumference arc (quarter turn).

13. The valve actuator device according to claim 12, characterized in that the position sensors (18, 18') are inductive-type position sensors.

14. The valve actuator device according to claim 1, characterized in that the sensor system (18, 18') as well as a volume of a main body of the display portion (12") are enclosed in a housing defined by a main cover cap (23).

15. The valve actuator device according to claim 14, characterized in that said main cover cap (23) has a through hole (27) for receiving said volume of the main body of the display portion (12").

16. The valve actuator device according to claim 15, characterized in that the main cover cap (23) and the display portion (12") form a visual indicator system for an operator to see an open position or a closed position or intermediate positions.

* * * * *

UNITED STATES PATENT AND TRADEMARK OFFICE
CERTIFICATE OF CORRECTION

Page 1 of 1

PATENT NO. : 11,946,566 B2
APPLICATION NO. : 18/149297
DATED : April 2, 2024
INVENTOR(S) : Emiliano Schifrin et al.

It is certified that error appears in the above-identified patent and that said Letters Patent is hereby corrected as shown below:

On the Title Page

Please add the following below item (65) relating to prior publication data:
--(30) Foreign Application Priority Data
Jan. 4, 2022 (AR) .......................... 20220100010--

Signed and Sealed this
Fifth Day of August, 2025

Coke Morgan Stewart
*Acting Director of the United States Patent and Trademark Office*